United States Patent [19]

McNamara

[11] 4,377,851
[45] Mar. 22, 1983

[54] METHOD FOR CALIBRATING A TRANSDUCER FOR CONVERTING PRESSURE VARIATION TO FREQUENCY VARIATION

[75] Inventor: David A. McNamara, Ypsilanti, Mich.

[73] Assignee: Ford Motor Company, Dearborn, Mich.

[21] Appl. No.: 219,128

[22] Filed: Dec. 22, 1980

[51] Int. Cl.³ ............................................. G01L 25/00
[52] U.S. Cl. .................................... 364/571; 364/558; 73/1 R
[58] Field of Search ........................ 364/571, 556, 558; 324/61 QS; 73/1 R, 4 R; 331/65

[56] References Cited

U.S. PATENT DOCUMENTS

| | | | |
|---|---|---|---|
| 3,790,910 | 2/1974 | McCormack | 73/4 R |
| 3,886,473 | 5/1975 | Heyck | 324/61 QS |
| 4,089,058 | 5/1978 | Murdock | 364/571 |
| 4,192,005 | 3/1980 | Kurtz | 364/558 |
| 4,198,677 | 4/1980 | Brunner et al. | 364/571 |

*Primary Examiner*—Gary Chin

*Attorney, Agent, or Firm*—Peter Abolins; Clifford L. Sadler

[57] ABSTRACT

The specification teaches a method for calibrating a transducer for converting pressure variation to a frequency variation of a periodic electrical signal. The transducer includes a reference signal source and a sensor signal source which are combined in a mixer. The method includes the steps of applying a first reference pressure to the transducer and measuring the first sensor signal frequency and applying a second reference pressure to the transducer and measuring a second sensor frequency. The reference signal frequency is measured during at least one of the applications of the first or second reference pressure. An actual, uncalibrated transfer function is calculated defining the mixer output signal frequency as a function of pressure. The slope of the actual transfer function is altered to a desired, calibrated slope by changing the magnitude of a resistor in the sensor signal source. The frequency axis intercept is altered to a desired, calibrated frequency intercept by changing the magnitude of a resistor in the reference signal source. The method permits calibration of the transducer to a desired transfer function thereby making possible identical transfer functions for a plurality of mass produced units.

5 Claims, 4 Drawing Figures

METHOD FOR CALIBRATING A TRANSDUCER FOR CONVERTING PRESSURE VARIATION TO FREQUENCY VARIATION

BACKGROUND

1. Field of the Invention

This invention relates to a method for calibrating a transducer for converting pressure variation to a frequency variation of a periodic electrical output signal.

2. Prior Art

Many capacitive transducers have been designed to provide a variation in electrical capacitance as a function of some other parameter. The other parameters may include pressure acting upon the "plates" of the capacitive transducer, the aligned areas of such plates, the positions of the plates as a function of mechanical movement, the type of dielectric material between the capacitive plates, and combinations of these. All of these capacitive transducers, however, have a common characteristic; they have a variation of an electrical capacitance that can be detected in a way that can provide a desired indication of the magnitude of the capacitance or its change and of the cause of such capacitance magnitude or change where the cause is the desired information.

Many prior art techniques are known for detecting capacitance variations. The electrical capacitance may be used, for example, to control an oscillator's frequency output and any capacitance variation can be made to cause a related variation in the output frequency. In U.S. Pat. No. 3,886,473 to Heyck, a capacitive transducer is described that converts a small displacement (such as could be caused by the effect of a pressure change on an aneroid) of a mechanical input member into a capacitance change. The Heyck system uses two oscillators, one of which generates an electrical signal having a second frequency controlled by the displacement (pressure variable) transducer. The Heyck system uses the fixed or reference frequency oscillator and the variable frequency oscillator to fill separate digital counters. The first counter, when filled, causes a gate to supply pulses to a third counter until the variable frequency oscillator has filled the second counter. Thus, the second counter contains a digital count proportional to the frequency difference between the periodic output signals from the two oscillators. The oscillators disclosed by Heyck are precision radio-frequency oscillators having both inductive and capacitive elements providing an output frequency that is inversely proportional to the square root of the product of the inductance and capacitance.

The Heyck patent mentions another system for detecting frequency variation caused by capacitance variation. This is accomplished with a fixed or reference frequency, a variable frequency due to capacitance change, a frequency equal to the difference between the fixed and variable frequencies and by use of a precision oscillator and divider to generate a precise counting period over which the difference frequency cycles are counted.

While capacitance variation can be detected as described above, the electrical circuits and necessary apparatus are very expensive and sensitive, require precise and individual calibration, and are very difficult to fabricate in large quantities in a way that would permit combined capacitive transducers and detection circuits of all to have identical transfer functions.

For mass production use of capacitive transducers and detection circuits, it is desirable to have identical transfer functions for all of the mass-produced units. If, for example, the frequency of the periodic output signal is inversely related to the capacitance that varies with a sensed parameter, it is desirable to have identical terms and coefficients in the transfer function applicable to all of the mass-produced capacitive transducers and associated detection circuits. Accordingly, a simple, reliable and repeatable method of fabrication and, in particular, of calibration is very desirable.

SUMMARY OF THE INVENTION

An embodiment of this invention includes a method for calibrating a transducer for converting a pressure variation to a variation in the frequency of an output periodic function. The transducer includes a reference signal processing means and a sensor signal processing means as inputs to a mixer signal processing means. The reference signal processing means generates a periodic reference electrical signal as a function of a reference timing capacitor and a reference resistor. The sensor signal processing means generates a periodic sensor electrical signal as a function of a variable sensor timing capacitor responsive to pressure changes and a sensor resistor. The mixer signal processing means generates a mixed periodic electrical signal having a frequency proportional to the difference between the reference and sensor electrical signals.

In accordance with one embodiment of this invention, the method includes the steps of applying a first reference pressure to the transducer and measuring a first sensor signal frequency, applying a second reference pressure to the transducer and measuring a second sensor signal frequency, measuring the reference signal frequency during at least one of the applications of the first reference pressure or the second reference pressure, calculating the actual (uncalibrated) transfer function defining the mixed signal frequency as a function of pressure, altering the slope of the actual transfer function to a desired (calibrated) slope by changing the magnitude of the sensor resistor, and altering the frequency axis intercept of the actual transfer function to a desired (calibrated) frequency axis intercept by changing the magnitude of the reference resistor.

Fabrication in accordance with an embodiment of this invention permits mass production of a transducer while providing for a calibrated output within a specified range. In particular, it is even possible to change the particular sensor capacitor used, for example, to reflect improving technology, while calibrating the transducer to provide a transfer function which produces the same output as before the change in the capacitor. Similarly, this transducer can be used to sense pressures of greatly different magnitudes by changing the transfer function of the transducer. Indeed, the transfer function can be adjusted to provide for a particular desired output.

BREIF DESCRIPTION OF THE DRAWINGS

Figure 3A:
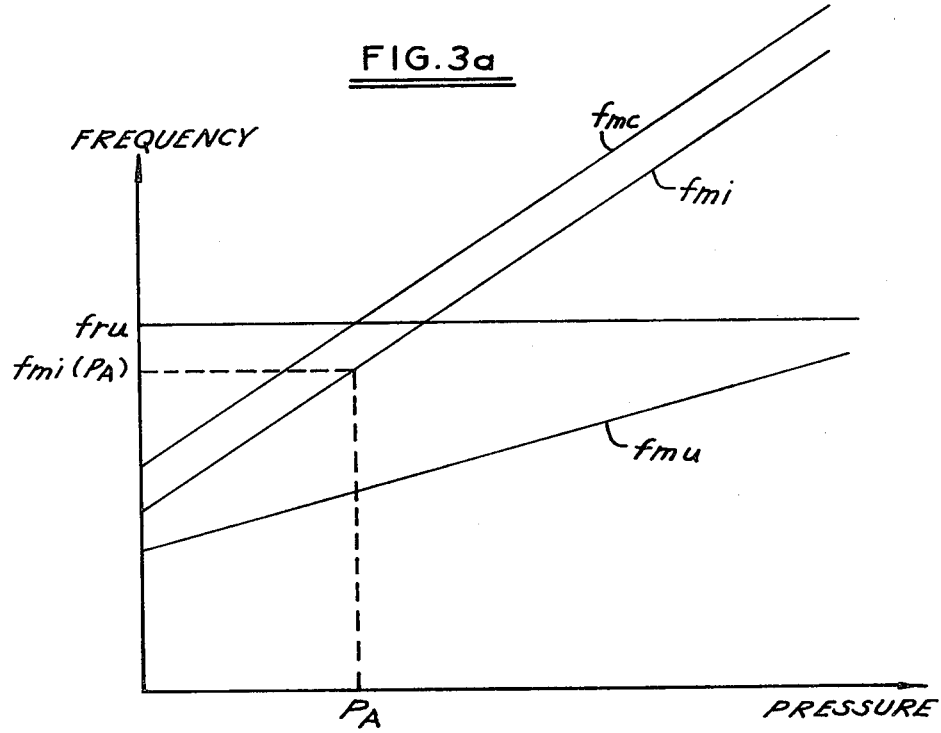
FIG. 3a is a graphical representation of the frequency versus pressure transfer function change of the uncalibrated mixed frequency so it has the same slope as a desired, calibrated mixer frequency in accordance with an embodiment of this invention.
Figure 3B:
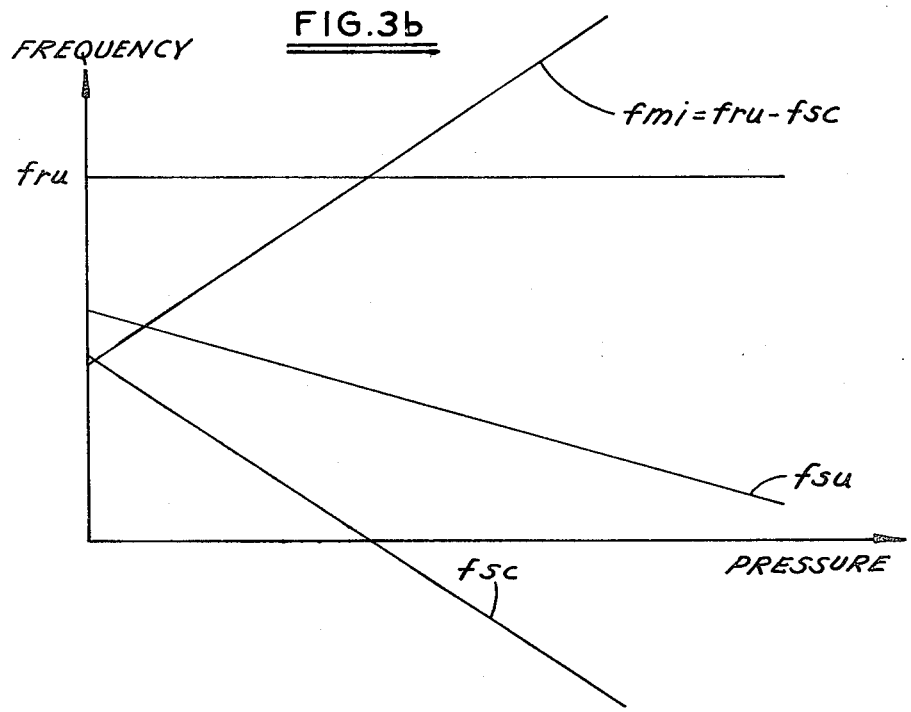
Figure 4:
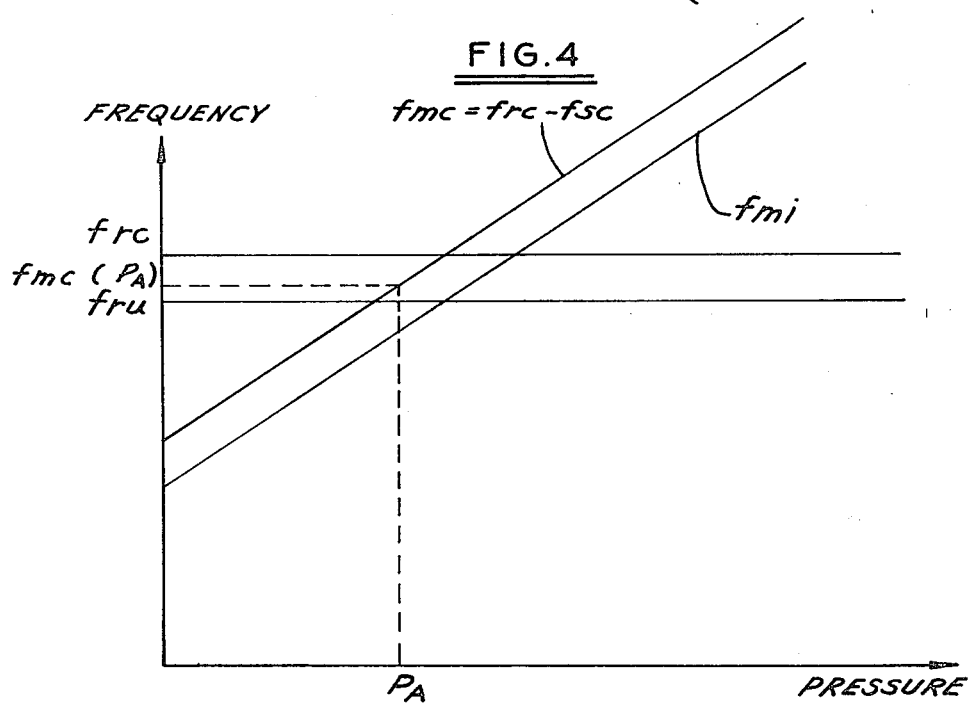

FIG. 3b is a graphical representation of the frequency versus transfer function of the sensor frequency, changing from an uncalibrated to a calibrated frequency, to accomplish the change in the mixer frequency, from an uncalibrated mixer frequency to an intermediate mixer frequency in accordance with an embodiment of this invention; and FIG. 4 is a graphical representation similar to FIG. 3a with the additional change of the uncalibrated reference frequency to a calibrated reference frequency thereby moving the transfer function representing the intermediate mixer frequency to the calibrated mixer frequency.

DETAILED DESCRIPTION OF THE INVENTION

Figure 1:
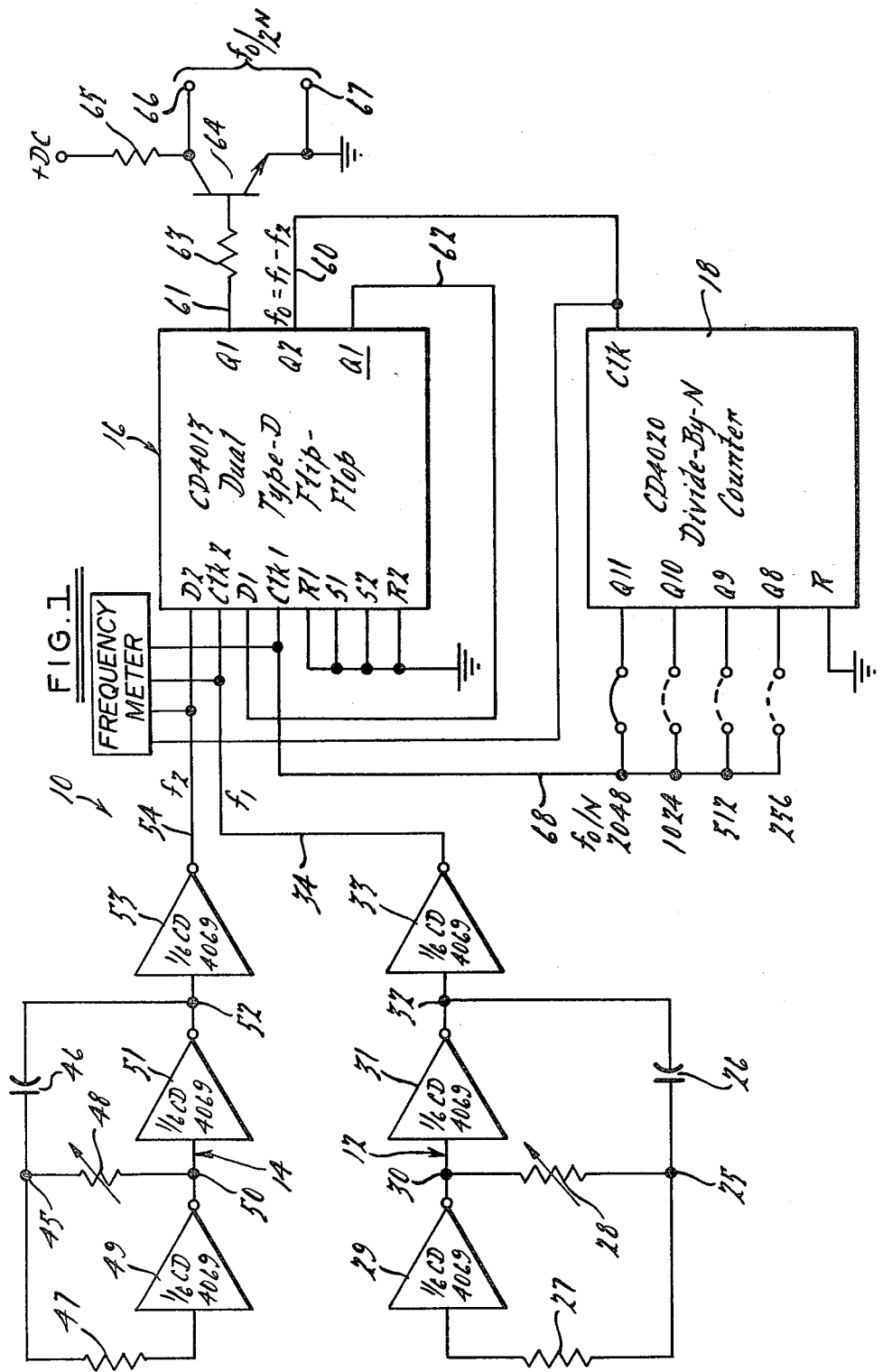
FIG. 1 is a schematic drawing of a circuit calibrated in accordance with an embodiment of this invention.

Referring to FIG. 1, a transducer 10 for converting pressure variation to frequency variation of a periodic output signal includes a dual type D flip flop 16 which has an input from an oscillator 14 at input D2 and an input from an oscillator 12 at input clock 2. Oscillator 12 provides a reference signal while oscillator 14 provides a signal responsive to pressure variation by having a pressure responsive capacitance 46. An output from flip flop 16 at Q2 is equal to the difference between the inputs at D2 and clock 2 and is applied to a clock input of a divide by N counter 18. Divide by N counter 18 has an output which is applied by a line 68 to an input clock 1 of flip flop 16. Counter 18 provides an output equal to the input frequency, $F_o$, divided by 256 at output Q8, divided by 512 at output Q9, divided by 1024 at output Q10, and divided by 2048 at output Q11. The reset of counter 18 is grounded. The output of transducer 10 occurs across a transistor 64 coupled by a resistor 63 through a line 61 to output Q1 of flip flop 16. A DC voltage is applied through a resistor 65 to the collector of transistor 64. The output is taken between collector terminal 66 and emitter terminal 67 of transistor 64.

Oscillator 12 includes sequentially coupled inverters 29, 31 and 33 which apply a frequency F1 through line 34 to clock 2 input of flip flop 16. A capacitor 26 is connected between a node 32, located between inverters 31 and 33 to a node 25. A reference resistor 28 is coupled between a node 30 located between inverters 29 and 31 to node 25. Resistor 28 is varied in magnitude during calibration of transducer 10. A resistor 27 is coupled between the input of inverter 29 and node 25.

Oscillator 14 is analogous to oscillator 12 and includes the serial coupling of inverters 49, 51 and 53 which have an output frequency F2 coupled to input D2 of flip flop 16 through a line 54. A capacitor 46 is coupled from a node 52, positioned between inverters 51 and 53 to a node 45. A sensor resistor 48 for adjusting the gain or slope of a transfer function is coupled from a node 50 between inverters 49 and 51 to node 45. Resistor 48 is varied in magnitude during calibration of transducer 10. A resistor 47 is coupled from the input of inverter 49 to node 45.

A typical component for the inverters is one-sixth of a CD4069. A typical component for flip flop 16 is a CD4013 Dual Type-D flip flop. A typical component for dive by N counter 18 is a CD4020.

Calibration of transducer 10 includes adjustment of sensor resistor 48 and reference resistor 28 so that the sensor frequency on line 54 and the reference frequency on line 34 are adjusted to produce a desired mixed output frequency on line 60.

Figure 2:
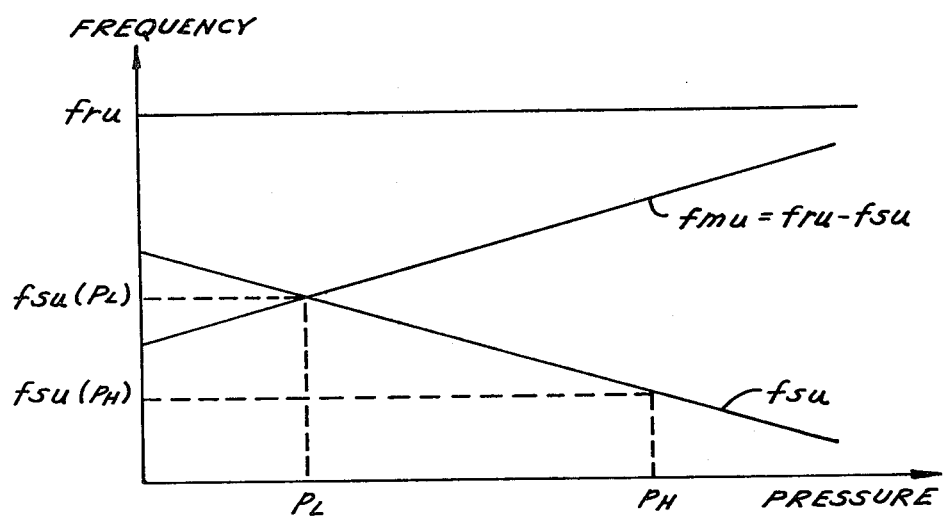
FIG. 2 is a graphical representation of the frequency versus pressure transfer function for the uncalibrated mixed frequency ($f_{mu}$), the uncalibrated sensor frequency ($f_{su}$), and the uncalibrated reference frequency ($f_{ru}$) in accordance with an embodiment of this invention.

Referring to FIG. 2, the uncalibrated frequency $F_{mu}$ is equal to the difference between the uncalibrated reference frequency, $f_{ru}$, and the uncalibrated sensor frequency, $f_{su}$ or $f_{mu}$ equals $f_{ru}$ minus $f_{su}$. To establish these lines a low pressure, $P_L$ and a high pressure, $P_H$, are applied to transducer 10. Upon the application of the low pressure, the sensor frequency is measured on line 54 and a first point corresponding to pressure $P_L$ and frequency $f_{su}$ ($P_L$) is established. Upon application of a high pressure, $P_H$, a second point corresponding to $P_H$, $f_{su}$ ($P_H$), is established. From these two points, a straight line can be drawn establishing the uncalibrated sensor frequency, $f_{su}$. The uncalibrated reference frequency is a constant and can be measured by sensing the frequency on line 34 at either of the two applied pressures, $P_L$ or $P_H$. Subtraction of the values of the uncalibrated sensor frequency $f_{su}$, from the values of the uncalibrated reference frequency, $f_{ru}$, generates the uncalibrated next frequency transfer function. As a result, FIG. 2 shows the initial, uncalibrated transfer functions relating applied pressure and frequency output of the sensor oscillator 14, reference oscillator 12, and mixer output of flip flop 16.

The goal of the following calibration of transducer 10 is to establish a transfer function between the pressure and mixed output frequency of a desired gain and offset, corresponding to a desired slope and frequency axis (Y) intercept. This desired transfer function is shown in FIG. 3a as the calibrated mixer frequency, $f_{mc}$. As shown in FIG. 3a, changing the uncalibrated mixer frequency transfer function $f_{mu}$, to the calibrated mixer frequency transfer function, $f_{mc}$, involves an intermediate step wherein an intermediate mixer frequency transfer function, $F_{mi}$ is established. The slope of the intermediate mixer frequency transfer function is the same as the slope of the calibrated mixer frequency transfer function. Since the slope of the intermediate mixer frequency is known, (it is the same as the calibrated mixer frequency) establishing a a single point will, in combination with the known slope establishes transfer function. To establish this single point, transducer 10 is exposed to an applied pressure $P_A$, while sensor resistor 48 is adjusted until a desired intermediate mixer frequency, $f_{mi}$ ($P_A$) is achieved. The frequency desired by adjustment of the sensor resistor 48 is defined by the following equation.

$$f_{mi} = f_{ru} + \left[ \frac{P_H - P_L}{f_{su}(P_H) - f_{su}(P_L)} + f_{su}(P_H) - P_H \right] m_c + m_c P_A$$

wherein $m_c$ is the desired calibrated slope of the transfer function defined by $f_{mc}$ in FIG. 3a. As a result, when a pressure $P_A$ is applied, the frequency $f_{mi}$ can be calculated. When this calculated frequency is achieved by adjustment of the sensor resistor 48 further adjustment of sensor resistor 48 is stopped and the resulting transfer function is as indicated in FIG. 3a as $f_{mi}$.

Referring to FIG. 3b, the adjustment of sensor resistor 48 is shown graphically by the shift of the transfer function of the uncalibrated sensor frequency to a transfer function of a calibrated sensor frequency, $f_{sc}$. The transfer function for the uncalibrated reference frequency remains the same during this shift. The shift in the sensor frequency causes a shift in the mixer frequency so that the intermediate mixer frequency $f_{mi}$ is equal to the difference between the uncalibrated reference frequency and the calibrated sensor frequency, or $f_{mi}$ equal $f_{ru}$ minus $f_{sc}$.

The remaining step to make the transfer function of the intermediate mixer frequency, $f_{mi}$, coincident with the transfer function of the calibrated mixer frequency, $f_{mc}$, involves a vertical shifting of the transfer function $f_{mi}$ upward so that there is a new frequency axis intercept. This shift is shown in FIG. 4 and is the result of a shift in the reference frequency from an uncalibrated to a calibrated function. The desired calibrated mixture frequency transfer function is known and is:

$$f_{mc} = b_c + m_c(P_A)$$

That is, for a given applied pressure, $P_A$, the calibrated mixer frequency, $f_{mc}(P_A)$ can be calculated. When $P_A$ is applied, reference resistor 28 is adjusted causing a shift in the transfer function from the uncalibrated reference frequency to the calibrated reference frequency, $f_{rc}$. During this shift, the sensor frequency output on line 54 remains constant at the calibrated sensor frequency, $f_{sc}$. The calibrated mixer frequency $f_{mc}$, is defined to be the difference between the calibrated reference frequency, $f_{rc}$ and the calibrated sensor frequency $f_{sc}$.

In the above described method, it is necessary at some point in the procedure to measure the mixer frequency, the sensor frequency and the reference frequency. It is also possible to make the assumption that there are no errors in the combination of the sensor frequency and the reference frequency to produce the mixed frequency. If this assumption is made, then sensor resistor 48 and reference resistor 28 can be adjusted while measuring only the sensor frequency on line 54 and the reference frequency on line 34. This method of measuring only the sensor frequency and reference frequency is best shown by reference to FIGS. 3b and 4. That is, in FIG. 3, the sensor frequency is shifted from an uncalibrated to a calibrated transfer function. This can be accomplished by measurement of only the sensor frequency while adjusting sensor resistor 48. Similarly, in FIG. 4, the reference frequency is shifted from an uncalibrated to a calibrated transfer function and this can be accomplished by measurement of the reference frequency on line 34. Since the mixed frequency output is not measured the resistor adjustments are made until the sensor frequency is equal to the following frequency as defined by equation A:

$$f_{sc}(P_A) = \left[ P_H - \frac{(P_H - P_L)}{f_{su}(P_L) - f_{su}(P_H)} \times f_{su}(P_H) \right] m_c - m_c(P_A)$$

note that in the special case where $P_A = P_H$ $$f_{sc}(P_A) = \left[ \frac{(P_H - P_L)}{f_{su}(P_H) - f_{su}(P_L)} \right] [f_{su}(P_H)] m_c$$

Similarly, the reference frequency is adjusted by adjusting of the reference resistor 28 until the output reference frequency is in accordance with the following equation B.

$$f_{rc} = b_c + \left[ P_H - \frac{(P_H - P_L)}{f_{su}(P_H) - f_{su}(P_L)} \right] [f_{su}(P_H)] m_c$$

If it is desired to reduce the mixture frequency by a factor such as 2 N as indicated by the output taken across terminals 66 and 67 in FIG. 1, the step of dividing the mixed frequency can be added. This was shown by the inclusion by the divide by N counter 16 in FIG. 1.

Various modifications and variations will no doubt occur to those skilled in the various arts to which this invention pertains. For example, the particular fabrication technique used in the manufacture of the integrated circuit may be chosen from any number of known techniques. It may be advantageous to use large scale integration techniques for high volume requirements. These and all other variations which basically rely on the teachings through which this disclosure has advanced the art are properly considered in the scope of this invention.

I claim:

1. A method for calibrating a transducer for converting a pressure variation to a variation in the frequency of an output periodic function, the transducer including a reference signal processing means and a sensor signal processing means as inputs to a mixer signal processing means, the reference signal processing means generating a periodic reference electrical signal as a function of a reference timing capacitor and a reference resistor, the sensor signal processing means generating a periodic sensor electrical signal as a function of a variable sensor timing capacitor responsive to pressure changes and a sensor resistor, the mixer signal processing means generating a mixed periodic electrical signal having a frequency proportional to the difference between the reference and sensor electrical signals, said method including the steps of:

applying a first reference pressure to the transducer and measuring a first sensor signal frequency;

applying a second reference pressure to the transducer and measuring a second sensor signal frequency;

measuring the reference signal frequency during at least one of the applications of the first reference pressure or the second reference pressure;

calculating the actual, uncalibrated transfer function defining the mixed signal frequency as a function of pressure;

altering the slope of the actual transfer function to a desired, calibrated slope by changing the magnitude of the sensor resistor; and altering the frequency axis intercept to a desired, calibrated frequency intercept by changing the magnitude of the reference resistor.

2. A method for calibrating as recited in claim 1 wherein the steps of altering the slope and frequency axis intercept include:

calculating a first mixed signal frequency using the actual transfer function with the desired slope instead of the actual slope while holding a constant third reference pressure;

measuring the mixed signal frequency output while holding the constant third reference pressure and changing the sensor resistor magnitude until the measured mixed signal frequency is equal to the calculated first mixed signal frequency;

calculating a second mixed signal frequency using the desired transfer function while holding a constant third reference pressure; and measuring the mixed signal frequency output while holding a constant third reference pressure and changing the reference resistor magnitude until the measured mixed signal frequency is equal to the calculated second mixed signal frequency.

3. A method for calibrating as recited in claim 2 wherein the step of calculating the first mixed signal frequency includes using the following equation $$f_{mi}(P_A) = f_{ru} + \left[ \frac{P_H - P_L}{f_{su}(P_H) - f_{su}(P_L)} f_{su}(P_H) - P_H \right] m_c + m_c P_A$$

wherein $P_A$ is the applied constant third reference pressure;

$P_H$ is the first reference pressure;

$P_L$ is the second reference pressure;

$f_{mi}(P_A)$ is the first mixed signal frequency at $P_A$;

$f_{ru}$ is the reference electrical signal component at an uncalibrated transfer function defining the mixed signal frequency as a function of pressure;

$f_{su}(P_H), f_{su}(P_L)$ is the sensor electrical signal component of an uncalibrated transfer function defining the mixed signal frequency as a function of pressure, at an applied pressure ($P_H$) and at an applied pressure ($P_L$), respectively, $m_c$ is the desired calibrated slope of a calibrated transfer function defining the mixed signal frequency as a function of pressure.

4. A method of calibrating as recited in claim 1 wherein the steps of altering the slope and frequency axis intercept include:

calculating a sensor signal frequency using the actual transfer function relating the pressure to the sensor signal frequency with the desired slope instead of the actual slope while holding a constant reference pressure;

measuring the sensor frequency output while holding a constant pressure and changing the sensor resistor magnitude until the measured sensor signal frequency is equal to the calculated sensor signal frequency;

calculating a reference signal frequency using the desired transfer function relating the pressure to the reference signal frequency while holding a constant reference pressure; and measuring the reference frequency output while holding a constant pressure and changing the reference resistor magnitude until the measured reference signal frequency is equal to the calculated reference signal frequency.

5. A method of calibrating as recited in claim 4 wherein the step of calculating the sensor signal frequency includes using the following equation:

$$f_{sc}(P_A) = \left[ P_H - \frac{P_H - P_L}{f_{su}(P_H) - f_{su}(P_L)} f_{su}(P_H) \right] m_c - m_c P_A$$

and the step of calculating the reference signal frequency includes using the following equation:

$$f_{rc} = b_c + \left[ P_H - \frac{(P_H - P_L)}{f_{su}(P_H) - f_{su}(P_L)} \right] [f_{su}(P_H)] m_c$$

wherein:

$P_A$ is the applied constant third reference pressure;

$P_H$ is the first reference pressure;

$P_L$ is the second reference pressure;

$f_{mi}(P_A)$ is the first mixed signal frequency at $P_A$;

$f_{ru}$ is the reference electrical signal component at an uncalibrated transfer function defining the mixed signal frequency as a function of pressure;

$f_{su}(P_H), f_{su}(P_L)$ is the sensor electrical signal component of an uncalibrated transfer function defining the mixed signal frequency as a function of pressure, at an applied pressure ($P_H$) and at an applied pressure ($P_L$), respectively;

$m_c$ is the desired calibrated slope of a calibrated transfer function defining the mixed signal frequency as a function of pressure;

$f_{rc}$ is the reference electrical signal component of a calibrated transfer function defining the mixed signal frequency as a function of pressure.

* * * * *